March 2, 1965    J. A. CWIK    3,171,228
ROD GUIDES AND TIPS
Filed Oct. 12, 1959
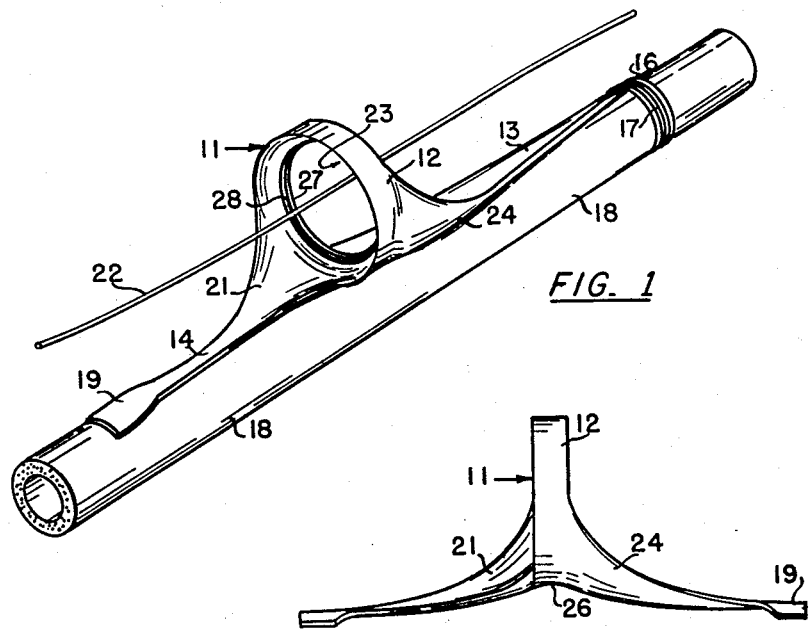
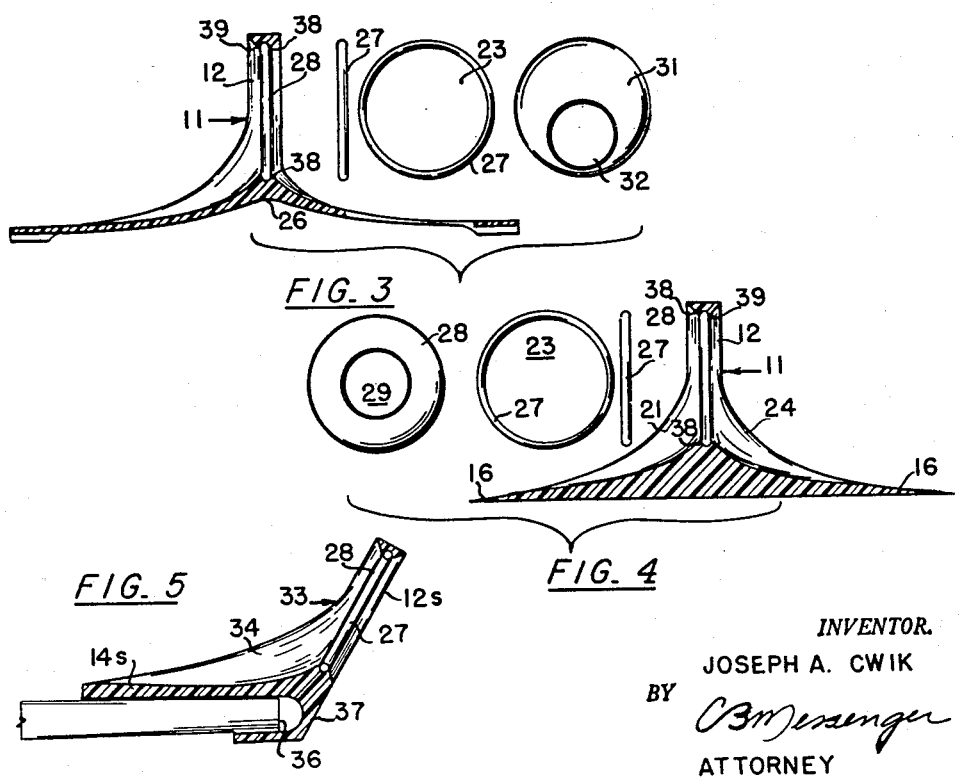
INVENTOR.
JOSEPH A. CWIK
BY
C B Messenger
ATTORNEY

United States Patent Office 3,171,228
Patented Mar. 2, 1965

3,171,228
ROD GUIDES AND TIPS
Joseph A. Cwik, Denver, Colo.
(6045 Brooks Drive, Arvada, Colo.)
Filed Oct. 12, 1959, Ser. No. 845,954
3 Claims. (Cl. 43—24)

The present invention relates to improvements in rod guides and tips for fishing poles.

An object of the invention and improvement is to provide rod guide eyes and tips which may be molded from plastics materials to obtain a unit of desired serviceability, flexibility, economy and freedom from corrosion.

Another object of the present invention is to provide rod guides and tips that may be manufactured economically from moldable materials to be of such size, shape and form that cooperatively formed wear rings may be provided for interchangeable and replacement usage.

A further object of this invention is to provide a replaceable wear resistant surface for rod guides and tip ends.

Another object of this invention is to provide molded product guides and tip ends of novel size, shape and conformation.

A further object of this invention is to provide guides and tip ends that may be affixed to fishing rods by adhesive or bonding cements to simplify installation procedures and reduce costs.

Further objects and advantages of the present invention reside in the provision of a flexible rod guide and tip end structure that resists deformation yet retains desirable properties of resilience, and in the further provision of replaceable eyes or wear rings that may have openings of various size for usage with different types of fishing gear.

Further objects and advantages of the present invention will be apparent from the appended description and drawings, in which FIG. 1 is a perspective view showing the general design features of an embodiment of this invention, FIG. 2 is a side elevation further showing features of this invention, FIG. 3 is an exploded elevation in partial cross-section showing further features of the present invention, together with interchangeable wear rings therefor, FIG. 4 is an exploded elevation in partial cross-section showing a modified embodiment together with interchangeable wear rings therefor, and FIG. 5 is an elevation in partial cross-section showing an adaptation of the present invention as used in connection with the construction of rod tip ends.

Briefly stated, the present invention provides rod guides and tip ends which may be made by injection molding processes to provide a flexible type structure ideally suited for its intended uses. The main features includes the provision of snap out wear rings designed to eliminate wear of the rod guide and tip ends themselves and further making it possible to provide an eyelet opening of different size for different types of fishing.

The detailed features of separate embodiments of the invention are shown in the accompanying figures, in FIGS. 1, 2, 3 and 4 of which types of rod guide construction are shown. In FIGS. 1, 2 and 3 the general design configuration of a preferred embodiment of the invention is shown. Here the rod guide 11 is seen to comprise a ring shaped support 12 disposed at substantially a right angle with respect to forwardly and rearwardly extending projections 13 and 14. These projections may be of different shape and conformation, as shown, depending upon the type of mounting to be used. As indicated for the forward projection 13, the structure can taper to a thin point 16 if it is desired to affix the rod guide in conventional manner, as by wrapping 17.

Since the use of molded plastics makes it possible to apply the rod guides 11 to a fishing rod 18 with a bonding adhesive or cement, a flange 19 may be provided on the projections 13 and 14 in order to obtain a larger surface area of contact between the rod guide 11 and the fishing pole 18. It has been found that usage of epoxy bonding cements securely and adequately holds a rod guide of the described type to many different types of fishing poles.

Since it is desirable that the rod guides be made in a single molding operation, and further since it is desirable that a simple form of die be used to make such elements, it will be seen that the illustrated preferred embodiment of the invention has different conformation on opposite sides of the ring support 12. At the rearwardly disposed end, which is nearest the reel seat, a guide flange 21 is formed which will tend to direct and guide the fishing line 22 through the open center 23 of the ring structure. A similar flange 24 is provided on the outwardly disposed end projection 13, but flange 24 is positioned on the opposite lateral side of the ring support 12. This flange 24 is likewise adapted to help guide the fishing line 22 and to prevent any wrapping or entanglement of the fishing line about the upstanding ring support structure 12. Guide flanges 21 and 24 extend up past the mid-level or widest part of the ring support 12 to keep the line 22 from wrapping around the ring support 12.

Since it is highly desirable that the rod guide 11 be relatively flexible on the fishing pole 18 in order to obtain desirable casting and retrieving characteristics, the ring support 12 is preferably raised out and away from a position of contact with the pole beneath the ring support 12. This bridging conformation is shown in FIGS. 2 and 3 and is indicated by the numeral 26. Whether the rod guide 11 is to be attached to the pole 18 by the wrapping 17 or by a bonding cement applied to the flanges 19, the bridged conformation 26 beneath and adjacent to the support ring 12 and out of contact with the pole 18 will be preserved. This desirable flexible mounting and the use of a molded plastic, such as nylon or polyethylene, provides advantages due to the resilience and flexibility of the material.

Rod guides made and attached in this manner will provide maximum resilience and flexibility as necessary to provide desired action characteristics. Further, the described structure will resist deformation due to rough or careless usage better than conventional all-metal rod guides.

This inherent flexibility further makes it possible to provide and install wear rings of material different than that of the rod guide 11 itself. Accordingly, if the molded plastic that is to be used has little resistance to cutting and wear by the fishing line, a separate wear ring 27 may be inserted in the formed recess 28 so that a fishing line passing through the opening 23 will come in contact with the inner surface of such wear ring.

Since the wear rings may be inserted or removed easily by the slight resilient deformation of the rod guide 11, it is possible to incorporate a further advantage in connection with the present structure. Besides the provision of replaceable wear rings 27 that may be installed when necessary, it is possible and feasible to provide a set of wear rings having different sized eyelet openings therethrough. As shown in FIG. 4, a wear ring 28 having a small opening 29 may be provided if it is desired to use the fishing pole as a fly rod or for bait casting, whereas the larger size opening 23 in wear ring 27 is useful in spin casting. If, as in fly fishing, it is desired to keep the fishing line closer to the pole 18, a wear ring 31 having an eccentrically positioned opening 32 may be utilized.

Since the wear ring may be made of abrasion resistant material, the service life of rod guides and tips using such wear ring may be extended. Usually a type of corrosion resistant metal will be used, but due to the close support afforded by the ring support 12, it is possible that wear rings of ceramic or other hardened synthetic products may be used. Where the fishing pole is to be used for spin casting, surf fishing or trolling, the provision of a replaceable wear ring is believed to present a distinct advantage over previous structures. In deep sea fishing where metal lines are used, the present structure presents an economical and serviceable way to avoid the near constant replacement of rod guides and tip ends.

In order to facilitate replacement or substitution of wear rings, one lip 38 defining the recess 28 may be relieved, as shown in FIGS. 3 and 4, while the opposite lip 39 is extended inwardly to a smaller diameter in order to form a shoulder against which the wear rings 27, 28 and 31 may be engaged.

Where the weight of the rod guide 11 or where the cost of materials is not a determining factor, the flanges 21 and 24 may be continued up both of the opposite lateral sides of the support ring 12 to further assure freedom from fish line entanglement. Such derived structure will necessarily be relatively more inflexible, however. These features are shown in FIG. 4 where the bridged conformation 26 is also eliminated so that the ring support structure 12 and flanges 21 and 24 are in contact with the pole 18 along the full length of the rod guide 11. Dies for this symmetrical structure would be easier to make and the full length contact would make adhesive attachment easier.

A separate embodiment of the invention is shown in FIG. 5 where the features of this invention are applied to a design structure useful as a rod tip. In this figure a rod tip 33 is shown which has a pair of symmetrical flanges 34 to hold support ring 12s in angularly disposed position so that the recess 28 which receives and holds the wear rings 27 is disposed upwardly and outwardly from the end 36 of the fishing pole 18. As in the previous embodiment, a projection 14 is provided to facilitate attachment to the pole 18, and if desired, a tip end protector cap 37 may likewise be provided beneath the support ring 12s to receive and hold the end 36 of the pole 18.

In addition to the adaptability of the invention to both rod guides and tips, the present invention has many other useful advantages. A primary advantage is embodied in the fact that a molded plastic structure such as that disclosed can be made which is substantially lighter than presently used rod guides and tips for use on fly rods and on most other rod structures. This saving in weight is of substantial importance to the fisherman. Use of materials other than plastics, such as aluminum or magnesium, to form the general flange and support structure can likewise still be made lighter than presently used steel rod guides and tips.

The fact that structures made in accordance with this invention will be of uniform size and shape makes it possible to apply the devices automatically and mechanically to minimize the necessity for hand work and finishing of a fishing pole. Further savings in hand work are possible where the rod guides and tips are applied with an adhesive. This operation could be carried on after the final exterior finish had been applied to the pole, and accordingly it would be unnecessary to relacquer or refinish the pole and the thread bindings holding the rod guides to the pole.

Elimination of the thread binding, however, does not involve loss of attractive decorative color when devices made in accordance with this invention are used. Necessarily, these structures may be made of different colors of molded plastics, and the colors of the ring support may be different than that of the wear ring used therewith. In instances where aluminum is used, anodizing may be practiced to provide the desired different colors. If it is desirable to further decorate a fishing rod, customized appearances may be obtained by wrapping colored adhesive tapes of the desired width about the tip ends of the flanges to simulate present thread bindings.

While the invention has been described in connection with the use of circular rings and ring support structures, it is obvious that various other shapes inclusive of angular, oval and triangular may be used.

The separate novel features described and presented herein are obviously adaptable to various modifications and changes in addition to the separate embodiments of the invention shown and described. All such modifications and changes as come within the scope of the hereunto appended claims are considered to be a part of this invention.

I claim:

1. Convertible rod guides and tips for fishing poles comprising flanges adapted for engagement longitudinally along the fishing pole, a ring support member on said flanges with its axis transverse to said flanges, said ring support member having a central opening therethrough, said ring support member and flanged being made unitarily of a flexible material and said ring support further providing a circular recess groove adjacent the central opening therethrough, and a plurality of wear rings of material more resistant to abrasive wear than said unitary ring support and flanges for selective engagement in the recess groove of said ring support, said separate wear rings having central openings of varied size for selective use for different types of fishing use.

2. Rod guides and tips for fishing poles comprising flanges adapted for engagement longitudinally along the fishing pole, a ring support member on said flanges with its axis transverse to said flanges, said ring support member having a central opening therethrough, said ring support member and flanges being made unitarily of molded plastics flexible material and said ring support further providing a circular recess groove adjacent the central opening therethrough, and a wear ring of material more resistant to abrasive wear than said unitary ring support and flanges for selective engagement in the recess groove of said ring support, said wear ring having an eccentrically disposed opening therethrough for the passage of fishing lines.

3. Rod guides and tips for fishing poles comprising flanges adapted for engagement with said pole, a ring support member held in position on said flanges with its axis transverse to said flanges and said ring support further providing a central opening having a circular recess groove in the interior surface of said central opening, a wear ring for selective engagement in the recess groove of said ring support, said recess groove being defined by shaped lip members formed integrally with said ring support with one of said lip members being of greater internal diameter than the other to facilitate placement and replacement of said wear ring.

References Cited by the Examiner

UNITED STATES PATENTS

| | | | |
|---|---|---|---|
| 1,868,269 | 7/32 | Beadle | 43—24 |
| 1,869,441 | 8/32 | Shakespeare | 43—24 X |
| 2,296,174 | 9/42 | Meisler | 43—24 |
| 2,464,664 | 3/49 | Amon | 242—157 |
| 2,544,238 | 3/51 | Ritter | 43—24 |
| 2,878,609 | 3/59 | O'Brien | 43—24 |
| 2,895,199 | 7/59 | Jones | 24—218 X |
| 2,992,506 | 7/61 | Garbolino | 43—24 |

FOREIGN PATENTS

| | | |
|---|---|---|
| 1,169,454 | 9/58 | France. |
| 1,184,340 | 2/59 | France. |
| 6,514 | 1913 | Great Britain. |
| 201,326 | 8/23 | Great Britain. |

ABRAHAM G. STONE, *Primary Examiner.*